(12) United States Patent
Davies et al.

(10) Patent No.: US 11,086,856 B2
(45) Date of Patent: Aug. 10, 2021

(54) PROTECTING ANONYMITY FOR AGGREGATED REPORT GENERATION ACROSS MULTIPLE QUERIES

(71) Applicant: Google LLC, Mountain View, CA (US)

(72) Inventors: Scott Davies, Mountain View, CA (US); Justin Lewis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1050 days.

(21) Appl. No.: 15/400,564

(22) Filed: Jan. 6, 2017

(65) Prior Publication Data

US 2018/0196845 A1 Jul. 12, 2018

(51) Int. Cl.
*G06F 16/242* (2019.01)
*G06F 21/62* (2013.01)

(52) U.S. Cl.
CPC ...... *G06F 16/2425* (2019.01); *G06F 21/6254* (2013.01)

(58) Field of Classification Search
CPC .. G06F 16/248; G06F 16/243; G06F 16/9535; G06F 16/3024; G06F 16/634; G06F 11/323; G06F 16/2425
See application file for complete search history.

(56) References Cited

U.S. PATENT DOCUMENTS

| | | | |
|---|---|---|---|
| 2009/0177644 A1* | 7/2009 | Martinez | G06F 16/951 |
| 2009/0248669 A1 | 10/2009 | Shetti et al. | |
| 2010/0125605 A1* | 5/2010 | Nair | C07C 69/704 |
| | | | 707/784 |
| 2010/0169331 A1* | 7/2010 | Karidi | G06F 16/951 |
| | | | 707/754 |
| 2012/0173373 A1* | 7/2012 | Soroca | G06F 16/9535 |
| | | | 705/26.3 |
| 2013/0014136 A1* | 1/2013 | Bhatia | H04N 21/4222 |
| | | | 725/9 |
| 2013/0238636 A1 | 9/2013 | Subramanya et al. | |
| 2014/0207746 A1 | 7/2014 | Song et al. | |
| 2016/0007083 A1* | 1/2016 | Gurha | H04N 21/252 |
| | | | 725/13 |
| 2016/0034463 A1 | 2/2016 | Brewer | |
| 2016/0224804 A1* | 8/2016 | Carasso | G06F 3/0484 |
| 2017/0142044 A1* | 5/2017 | Ball | G06Q 50/01 |

\* cited by examiner

*Primary Examiner* — Mariela Reyes
*Assistant Examiner* — Courtney Harmon
(74) *Attorney, Agent, or Firm* — Foley & Lardner LLP

(57) ABSTRACT

Systems and methods for providing interaction data in response to a query from a content provider are provided. One method includes receiving a query from the content provide including a plurality of parameters relating to interactions with a content item of the content provider. The method includes retrieving a set of log file records using the included plurality of parameters and generating a current set of records identifying interaction data with the content item. The method includes comparing the current set of records to a previous set of records generated by the one or more processors for a previous query from the content provider and determining a similarity between the current set of records and the previous set of records. The method includes modifying, if the similarity is above a threshold, the current set of records and providing the modified set of records to the content provider.

20 Claims, 8 Drawing Sheets

---

1000

Query Results

Your submitted query (query #0002) is similar to a previous query (query #0001, submitted x/x/xx). Below is interaction data from the previous query.

Query parameters:
Content Items: Content_Item_1, Content_Item_2
Dates: 1/1/17

| Platform | Total Users | Total impressions | Total clicks | Total conversions |
|---|---|---|---|---|
| all | 10000 | 12345 | 1234 | 123 |
| Mobile | 5000 | 6000 | 600 | 60 |
| Desktop | 5000 | 6345 | 634 | 63 |
| ... | ... | ... | ... | ... |

Query Results

The user interaction data generated based on your submitted query (query #0002) is similar to interaction data generated based on a previous query (query #0001, submitted x/x/xx). Please select the link below to re-run the previous query to access interaction data.

Execute old query

Query Results

Your submitted query (query #0002) is similar to a previous query (query #0001, submitted x/x/xx). Below is interaction data from the previous query.

Query parameters:
Content Items: Content_Item_1, Content_Item_2
Dates: 1/1/17

| Platform | Total Users | Total impressions | Total clicks | Total conversions |
|---|---|---|---|---|
| all | 10000 | 12345 | 1234 | 123 |
| Mobile | 5000 | 6000 | 600 | 60 |
| Desktop | 5000 | 6345 | 634 | 63 |
| ... | ... | ... | ... | ... |

Query Results

The results of query #0002 are below. 5% of the interaction data identified based on the query has been withheld from the data below.

Query parameters:
Content Items: Content_Item_1, Content_Item_2
Dates: 1/1/17

| Platform | Total Users | Total impressions | Total clicks | Total conversions |
|---|---|---|---|---|
| all | 10000 | 12345 | 1234 | 123 |
| Mobile | 5000 | 6000 | 600 | 60 |
| Desktop | 5000 | 6345 | 634 | 63 |
| ... | ... | ... | ... | ... |

PROTECTING ANONYMITY FOR AGGREGATED REPORT GENERATION ACROSS MULTIPLE QUERIES

BACKGROUND

In a networked environment, such as the Internet, first-party content providers can provide information to user devices for presentation on resources, such as webpages, mobile applications, documents, other applications, and/or other resources. Additional third-party content can also be provided by third-party content providers for presentation on the user devices together with the information from the first-party content providers. A publisher may provide first-party content and third-party content on his or her resource. One challenge is providing a report to a third-party content provider relating to the performance of the third-party content on the resource.

SUMMARY

One illustrative implementation of the disclosure relates to a method. The method includes receiving, by one or more processors, a query from a content provider, the query including a plurality of parameters relating to interactions with a content item of the content provider. The method further includes retrieving, by the one or more processors from a database, a set of log file records using the included plurality of parameters. The method further includes generating, by the one or more processors from the retrieved log file records, a current set of records identifying interaction data with the content item. The method further includes comparing, by the one or more processors, the current set of records to a previous set of records generated by the one or more processors for a previous query from the content provider. The method further includes determining, by the one or more processors, a similarity between the current set of records and the previous set of records. The method further includes modifying, by the one or more processors, in response to determining that the similarity is above a threshold similarity, the current set of records and providing the modified set of records to the content provider.

Another implementation relates to a system including at least one computing device operably coupled to at least one memory. The at least one computing device is configured to receive a query from a content provider, the query including a plurality of parameters relating to interactions with a content item of the content provider. The at least one computing device is further configured to retrieve, from a database, a set of log file records using the included plurality of parameters. The at least one computing device is further configured to generate, from the retrieved log file records, a current set of records identifying interaction data with the content item. The at least one computing device is further configured to compare the current set of records to a previous set of records generated by the one or more processors for a previous query from the content provider. The at least one computing device is further configured to determine a similarity between the current set of records and the previous set of records. The at least one computing device is further configured to modify, in response to determining that the similarity is above a threshold similarity, the current set of records and providing the modified set of records to the content provider.

Yet another implementation of the disclosure relates to one or more computer-readable storage media having instructions stored thereon that, when executed by one or more processors, cause the one or more processors to execute operations. The operations include receiving a query from a content provider, the query including a plurality of parameters relating to interactions with a content item of the content provider. The operations further include retrieving, from a database, a set of log file records using the included plurality of parameters. The operations further include generating, from the retrieved log file records, a current set of records identifying interaction data with the content item. The operations further include comparing the current set of records to a previous set of records generated by the one or more processors for a previous query from the content provider. The operations further include determining a similarity between the current set of records and the previous set of records. The operations further include modifying, in response to determining that the similarity is above a threshold similarity, the current set of records and providing the modified set of records to the content provider.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 9 illustrates an example user interface providing query results to a content provider according to an illustrative implementation.

FIG. 10 illustrates an example user interface providing query results to a content provider according to another illustrative implementation.

FIG. 11 illustrates an example user interface providing query results to a content provider according to another illustrative implementation.

DETAILED DESCRIPTION

Figure 1:
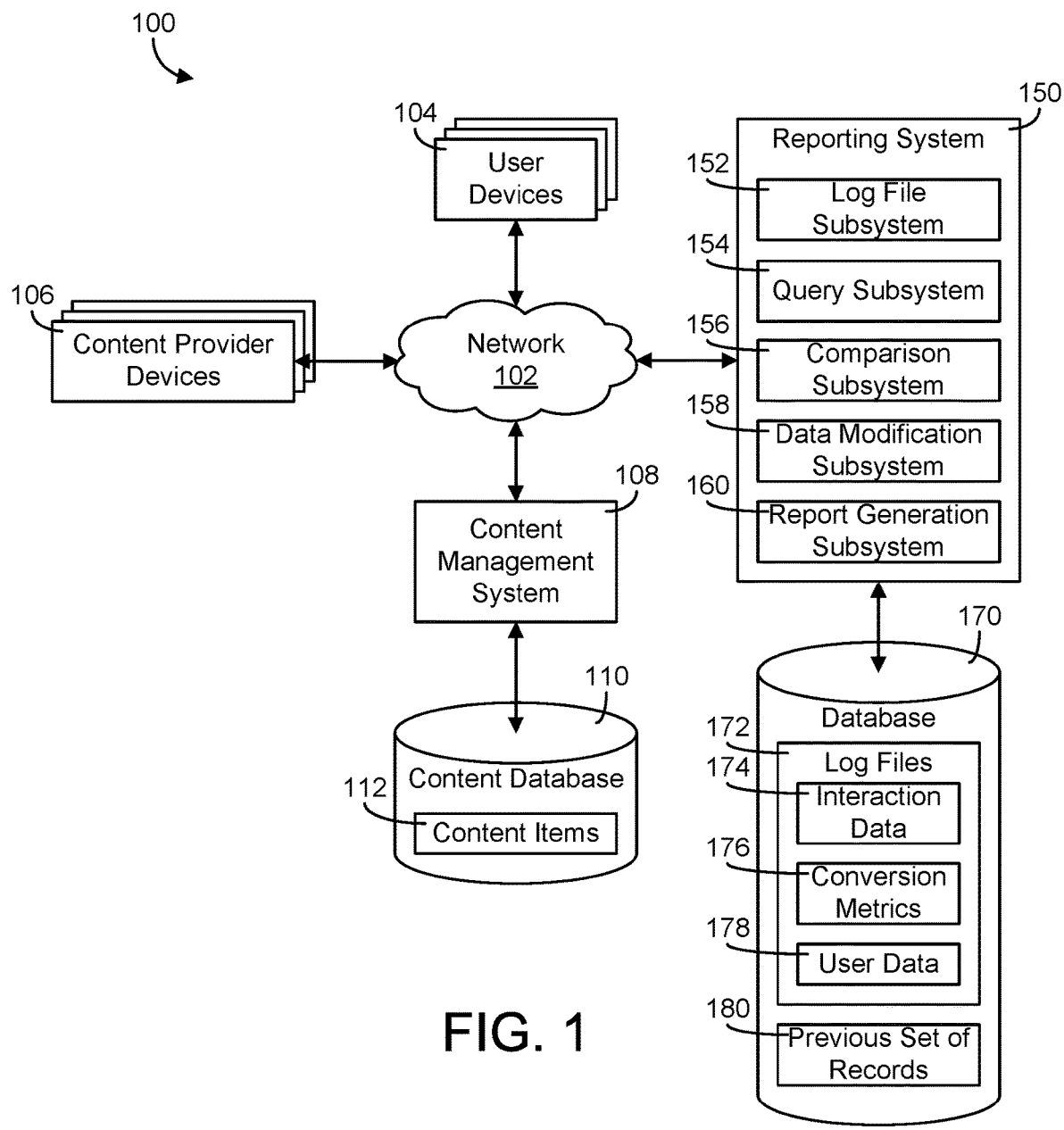
FIG. 1 is a block diagram of an reporting system and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods for providing query results to a content provider are shown. More particularly, the present disclosure relates to protecting user information in data provided to a content provider.

Content providers may provide third-party content for display on a resource (e.g., a webpage). It is important for content providers to understand the effectiveness of the content items (e.g., if content items on particular publisher sites or applications translates to better brand awareness and sales for the content provider). A reporting system may keep track of data relating to the content items (e.g., user interactions with the content items), and create reports for the content providers that aggregate the detail the data (e.g., for user interaction data, the number of unique users that interacted with the content item, the number of unique users that performed a desired action after the user interaction, etc.). The reporting system receives one or more queries from the content providers requesting data, and generates a set of records for a given query. However, there may be legal restrictions on the data that the reporting system can provide, or the data may include sensitive (e.g., proprietary) data. Therefore, the reporting system may take various measures to protect the data.

In some implementations, the reporting system provides aggregated reports (e.g., aggregated user interaction data sets), which may include a minimum number of data points, in order to protect data relating to individual actions. Aggregating reports, however, may not be sufficient to protect personally identifiable information from a particular interaction or action. For example, a content provider can submit multiple similar queries, with small differences in one or more parameters in each query. Each set of records returned to the content provider may include data from slightly different lists of interactions, which the content provider can use to identify data for individual interactions by comparing the data (i.e., identifying data that appears in one report but not another report). As one example, a content provider can run a first query for results for interactions relating to a first income level, and a second query for interactions relating to a second income level. By comparing the two query results, the content providers may identify interactions relating to a narrow range of income levels. The content provider may, for example, have a strategy of causing a first query to return results involving N interactions and a second query with N+1 interactions (this example is provided by way of example only; it may be possible for content providers to apply more complex techniques to various query results to achieve the desired results).

Referring generally to the disclosure, the reporting system can guard against such query manipulation by the content provider in various ways. These various methods prevent the content provider from receiving similar query results, and therefore from determining personally identifiable information within the query results by comparing the query results.

When a content provider submits a query to the reporting system, the reporting system can retrieve a set of records for the query and compare the set of records with previous set of records provided to the content provider in previous queries. If the two sets of results are too similar to one another, the reporting system can provide one of several alternatives to the set of records for the current query. One alternative is to show the results of an old query previously submitted by the content provider. The reporting system may further present a link, on a user interface of a device of the content provider, to execute the old query to reproduce the previous set of records. Another alternative is to show a previous set of records generated from a previous query, instead of the current set of records generated by the new query. The reporting system may also provide dialog explaining from which old query the set of records was generated.

Another alternative is to show a set of records generated from an old query and/or a modified version of a set of records generated from the new query. The modified set of records excludes elements that would be included in the new set of records that were not present in the old set of records. The modified set of records may also include a value representing the difference between the modified set of records and the old set of records. As an example, if the old set of records had forty-five results and the new set of records included the same forty-five results plus five new results, the modified set of records would include the forty-five original results plus a note that 10% of the results were excluded.

There are various alternative implementations that can be implemented by the reporting system. As one example alternative, the reporting system can remove individual interactions from the set of records, and add artificial data to the set of records, such that the new set of records is no longer too similar to an old set of records provided to the content provider. The reporting system can determine which interactions to remove from the set of records, and what artificial interaction data to add, based on what data has been previously reported to the content provider. The content provider may be told how many rows or entries in the set of records have been modified.

In some implementations, noise (e.g., random noise) can be added to each set of records, and the content provider may be told how many rows or entries in the set of records have been added. The noise to be added to a given set of records may be consistent with the noise added to previous set of records. In other words, the noise added by the reporting system is consistent across multiple queries submitted by the content provider.

In some implementations, the reporting system can remove a random subset of interactions from a given set of records. When similar queries are run in the future by the content provider, they then cannot tell whether new interactions in the current set of records were originally part of the original set of records, or represent a recent change in the set of records.

In some implementations, the reporting system may progressively remove additional elements in each set of records for a content provider over time. For example, if 10% of interactions were removed from a first set of records provided to the content provider, then the same 10% of interactions plus an additional 5% of interactions can be removed from a second set of records for a second query similar to the first query. An additional percentage of interactions may be removed for each subsequent similar query.

In some implementations, the content provider may run multiple queries that could return similar set of records, even if it was not the intention of the content provider (i.e., the content provider is not acting maliciously). To account for such situations, the reporting system may identify to the content provider that the set of records for the current query is too similar to a set of records for a previous query. The reporting system may provide the previous set of records, along with one or more suggestions or other information to assist the content provider in submitting a query that can generate a different set of records.

It should be understood that the various features and methods described in the present disclosure may be used alone or in combination with one another when generating a set of records. For example, artificial interaction data may be added to a set of records and interaction data may be removed from the set of records simultaneously. As another example, the reporting system may determine a method of editing the set of records from a previous query, and apply the same method to a new query. As yet another example, the reporting system may remove a first group of interaction data from a set of records randomly, and a second group of interaction data from the same set of records based on the previous set of records.

In the present disclosure, the term "current set of records" is used to define a set of data for a most recent query received from a content provider, and the term "previous set of records" is used to define a set of data for a an older or previous query from the same content provider. It should be understood that such terminology is not limiting. In some implementations, the data of the query is representative of interaction data relating to the interactions of one or more users with content items; in other implementations the data may be any type of data relating to the display and usage of the content items of the content provider. It should be understood that the description of user interaction data as described below is not limiting.

For situations in which the systems discussed herein collect and/or utilize personal information about users, or may make use of personal information, the users may be provided with an opportunity to control whether programs or features may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users.

Referring now to FIG. 1, and in brief overview, a block diagram of a reporting system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access webpages (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106. In some implementations, content management system 108 may select one or more content items from one or more content providers among a plurality of content items from a plurality of content providers. In such implementations, content management system 108 may determine content to be published in one or more content interfaces of resources (e.g., webpages, applications, etc.) shown on user devices 104 based at least in part on metrics or other characteristics of the content items or content providers.

A reporting system 150 may be configured to receive data with one or more resources of a content provider. In some implementations, the data is interaction data. The interaction data indicates user interactions with a resource and/or content within the resource (e.g., interactions relating to a content item presented on a resource). Reporting system 150 may use the interaction data to generate data related to the user interactions. The data may include, for example, a number of clicks or impressions on a content items, a cost for the content provider associated with displaying the content items, a number of conversion events executed by a user in response to viewing a content item, etc. Reporting system 150 may then generate a set of records in response to a query request submitted by a content provider device 106. The set of records is an aggregated collection of data relating to interactions with one or more content items. The data is aggregated based on user interaction data identified based on one or more parameters of the query.

Referring in greater detail to FIG. 1, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may include a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to select third-party content items to be presented on a resource. For example, content management system 108 may conduct an auction or bidding process. One or more content items of one or more winners of the auction or bidding process can be selected for display on the resource. Content management system 108 may further use a quality score (i.e., a measure of how likely a user of user device 104 is to interact with the content item or take a conversion action related to the content item) or other metric during the process of selection of the content item. Content providers, in some implementations, may create a content campaign, or may otherwise provide various settings or guidelines to content management system 108. Such settings or guidelines may govern how the content provider participates in the auction or bidding process (e.g., how much to bid in a given auction, a total budget (weekly, daily, or otherwise) for the content provider, etc.). Such settings or guidelines may be set based on various metrics, such as a cost per impression or cost per thousand impressions (CPM), a cost per click (CPC), or a cost per acquisition (CPA) or cost per conversion. Such settings or guidelines may further be set based on the type of platform on which a content item should be provided (e.g., mobile, desktop, etc.), what type of resource on which a content item should be provided (e.g., a search results page), a geographic location of the user device displaying the resource, and the like.

As described above, reporting system 150 is configured to generate a report for a content provider in response to a query from a content provider. The query may be submitted to reporting system 150 via a content provider device 106, or may be a scheduled query (e.g., the content provider wishes to run a particular query on a consistent basis). Reporting system 150 is shown to include a log file subsystem 152 configured to receive interaction data for a plurality of content items and resources. Log file subsystem 152 may then generate one or more log files 172 including interaction data for the content items and store the log files in database 170.

Log files 172 may include interaction data 174 and conversion metrics 176 for a plurality of interactions and conversion events relating to one or more content items displayed on a resource. For example, a interaction or conversion event may include a user viewing a content item on a resource, clicking or otherwise interacting with the content item, completing a purchase on the resource relating to the content item, watching a particular video or viewing a particular image, clicking on a link, or any other action that may be desired by the content provider providing the content item. Interaction data 174 may include data such as a date/time or timestamp on which the action occurred, a platform (e.g., browser) used to complete the action, and the like. Log files 172 may further include user data 178, which may include an anonymous identifier for the user differentiating the user from other users, for example. Log files 172 may be stored in any format within database 170 (e.g., table, spreadsheet, text file, etc.). For example, log files 172 may be generated for a given time frame (e.g., a log file for interaction data generated in a given time period), or based on any other metric.

Query subsystem 154 may receive a query or request from a content provider (e.g., via content provider device 106), or may automatically generate a query for a content provider based on a schedule or other preferences specified by the content provider. Query subsystem 154 may receive the query and parse the query to identify one or more parameters. The parameters may include one or more content items relating to the query (i.e., one or more specific content items for which the content provider wants a report generated). The parameters may further include one or more resources or platforms (e.g., specific webpages on which the content item was displayed, specific types of user devices, etc.). The parameters may further include characteristics such as a geographic location, demographics, user registration characteristics (i.e., if the user has an account with the content provider), and the like. The parameters may further include one or more dates and times, indicating that the content provider wishes to view interactions in a given time frame. After identifying the one or more parameters, log file subsystem 152 may identify a set of log file records in database 170 that may include interaction data relevant to the one or more parameters. Log file subsystem 152 may then generate a current set of records from log files 172, identifying relevant interaction data 174. The current set of records may be aggregated data from log files 172 based on the identified parameters.

Comparison subsystem 156 may receive the current set of records identified via log file subsystem 152 and compare the current set of records to previous set of records 180 stored in database 170 (or elsewhere). For example, comparison subsystem 156 may identify the content provider submitting the query, and may retrieve one or more previous set of records generated for the content provider. Comparison subsystem 156 may then compare the current set of records to the previous set of records, and determine a similarity between the records. If the similarity exceeds a threshold, the data may be modified by data modification subsystem 158 as described below. If the similarity does not exceed a threshold, the data may not be modified, and report generation subsystem 160 may generate a report including the current set of records for the content provide as described below. The comparison is described in greater detail with reference to FIG. 2.

Data modification subsystem 158 may be configured to modify the current set of records such that the similarity between the current set of records and one or more previous set of records is lowered below a threshold. For example, data modification subsystem 158 may add artificial data to the current set of records, or remove data from the current set of records. The data modification process, according to an illustrative implementation is described in greater detail in FIG. 2. Report generation subsystem 160 may generate a report including either the unmodified current set of records (indicated by comparison subsystem 156) or the modified current set of records (generated by data modification subsystem 158). For example, report generation subsystem 160 may generate a user interface such as that shown in FIGS. 9-11.

Figure 2:
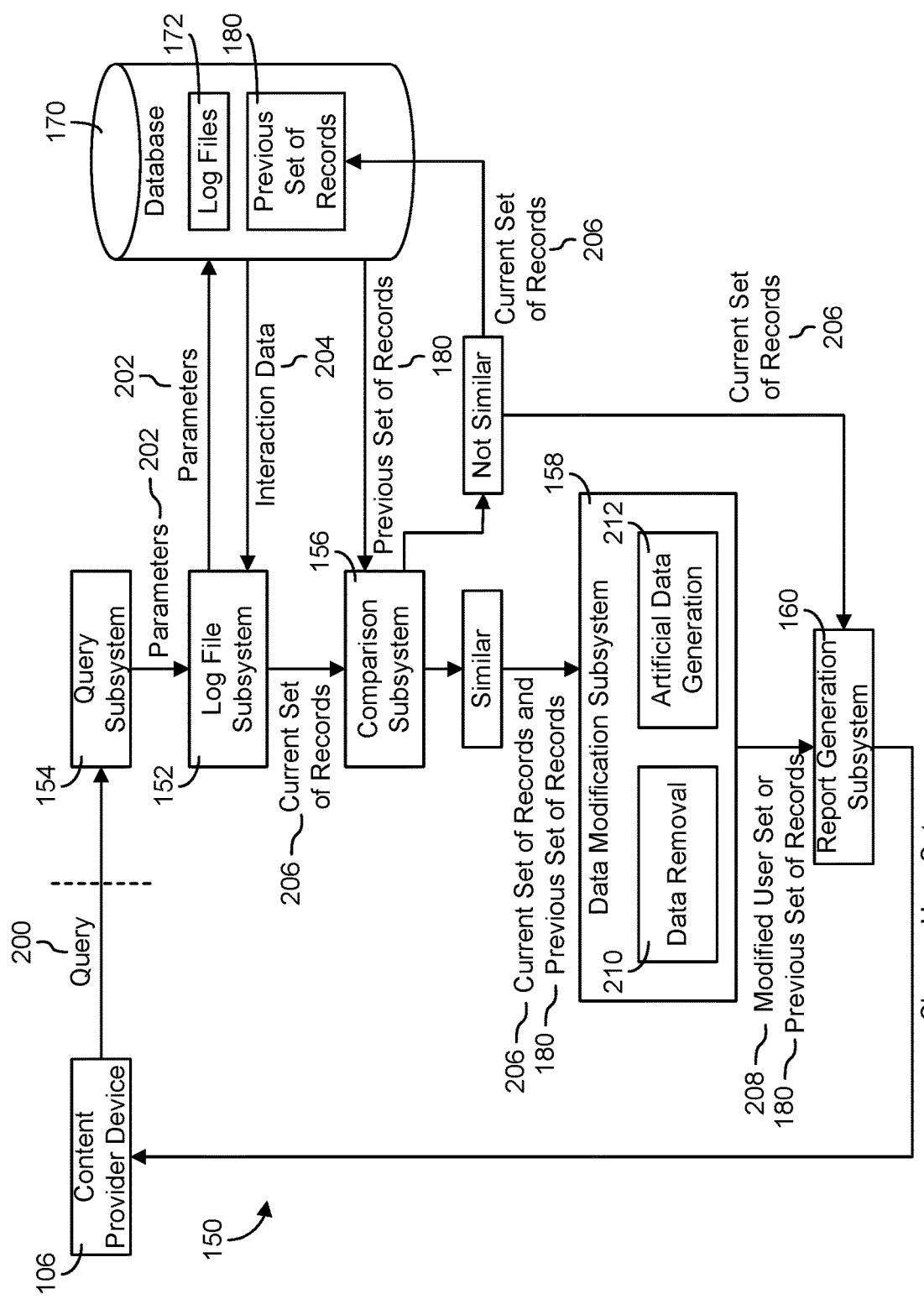
FIG. 2 is a detailed block diagram illustrating a process of generating a set of records in response to a query from a content provider according to an illustrative implementation.

Referring to FIG. 2, the activities and structure of reporting system 150 are shown in greater detail, according to an illustrative implementation. As described above, reporting system 150 may receive a query 200 from a content provider device 106 and parse query 200 at query subsystem 154. Query 200 includes one or more parameters 202 that are determined at query subsystem 154. In some implementations, parameters 202 include one or more specified content items. For example, the content provider may wish to receive a report including all interactions with a particular content item, or a group of similar content items. The content item parameters may identify a type of content item (e.g., an image, a video, text, or any combination thereof) for which interaction data should be retrieved.

In some implementations, parameters 202 may identify one or more resources or platforms. For example, the content provider may wish to receive a report indicating all interactions for content items displayed on a particular webpage (or group of webpages, or webpages with a similar topic), a particular type of device (e.g., laptop, tablet, mobile device, etc.), or the like. In some implementations, parameters 202 may include characteristics such as a geographic location of a device (e.g., generating a report for all interactions in a specific location), or demographic information. For example, the content provider may wish to see a report relating to similarly behaving users, users with similar demographics, all users who are registered or have an account with the content provider, or the like. In some implementations, parameters 202 may include one or more dates and times, indicating that the content provider wishes to view interactions in a given time frame (e.g., a one week period, a one month period, all interactions before or after a given date, all interactions occurring at a specific time of day, etc.). The parameters may be any combination of the above described parameters, and the examples provided above are not limiting.

After identifying parameters 202, reporting system 150 and more particularly log file subsystem 152 may retrieve a set of log file records using the parameters. Each log file 172 stored in database 170 may include a plurality of interaction data for a plurality of interactions. Each interaction may generally include, for example, a user identifier, a timestamp, a type of interaction and/or conversion event, the content item associated with the interaction, the resource on which the content item was presented, the type of user device on which the content item was viewed, and the like. Log file subsystem 152 may compare parameters 202 to the interaction data to determine which interaction data 204 is a match for the query submitted by the content provider. Log file subsystem 152 may collect interaction data 204 from database 170 and aggregate the data. By aggregating the data, log file subsystem 152 includes interaction data for interactions that share parameters with the identified parameters, but prevents data from an individual interaction from being surfaced. The aggregated data may be provided as a current set of records 206 to comparison subsystem 156.

In some implementations, reporting system 150 may determine that there is not enough interaction data 204 for a given query. For example, if a minimum number of interactions is not met, reporting system 150 may choose not to generate a response to the query, and may provide an indication to the content provider that not enough data is available.

Comparison subsystem 156 may receive current set of records 206 from log file subsystem 152, and one or more previous set of records 180 from database 170. Comparison subsystem 156 may determine which previous set of records to use for the comparison based on one or more parameters of both the current query and the previous queries. Comparison subsystem 156 may compare current set of records 206 to previous set of records 180 to determine a similarity between the two sets. Comparison subsystem 156 may use any type of comparison technique to determine a similarity between the two sets. For example, comparison subsystem 156 may use a min-hash technique to determine similarity. It should be understood that any type of comparison between the current set of records 206 and the previous set of records 180 may be used without departing from the scope of the present disclosure, and that the similarity threshold for the comparison may vary in accordance with various content provider and reporting system preferences. If the two sets are deemed not to be similar, the current set of records 206 may be returned as a query result to the content provider through report generation subsystem 160. Current set of records 206 may further be stored in database 170 for comparison to future current sets of records generated for future queries.

If the two sets are too similar, current set of records 206 may be modified until the similarity between the current set of records and previous set of records 180 is below a threshold. Data modification subsystem 158 may receive both set of records 206, 180 and modify current set of records 206 based on various methods as described below. Data modification subsystem 158 may generally choose at least one of removing data from current set of records 206, adding data from previous set of records 180 to current set of records 206, and adding artificial data to current set of records 206.

In some implementations, reporting system 150 may choose between one of three actions. In a first action, reporting system 150 may choose to simply indicate to the content provider that the current query produced a current set of records too similar to a previous set of records generated from a previous query. In such a case, reporting system 150 may provide a link that, upon selection, executes the previous query and returns the previous set of records for the previous query. In such a case, the activities of data modification subsystem 158 are not needed. In a second action, reporting system 150 may choose to show the previous set of records from the previous query instead of the current set of records from the current query. Reporting system 150 may further include dialog explaining to the content provider that the current set of records for the current query is too similar to the previous set of records being displayed. Again, in such a case, the activities of data modification subsystem 158 are not needed. In a third action, reporting system 150 may choose to modify current set of records 206 and to provide the modified data as a set of records to the content provider. In some implementations, reporting system 150 may also provide the previous set of records for the previous query as well. In such a case, data modification subsystem 158 may modify current set of records 206 as described below.

It should be understood that reporting system 150 may choose between the three actions described above in any way. For example, reporting system 150 may prefer one action depending on how many times a content provider has provided a query that has resulted in a similar set of records being identified (e.g., simply providing the previous set of records in cases where the content provider submits many similar queries). Further, reporting system 150 and data modification subsystem 158 may determine an amount of modification needed to make the current set of records different from the previous set of records, and may determine a course of action accordingly.

Data modification subsystem 158 may remove data from current set of records 206 (210). In some implementations, data modification subsystem 158 may identify a difference between a previous set of records and current set of records 206. If the difference between the two is substantially an addition of interaction data present in current set of records 206 that is not present in a previous set of records, then such interaction data may be removed by data modification subsystem 158. This would result in current set of records 206 matching the previous set of records. A modified current set of records 208 may then be provided to reporting subsystem 160 for reporting. An indication may be provided with the modified set of records indicating that a percentage of the interaction data from current set of records 206 was removed. For example, if the previous set of records had data from forty-five interactions, and five interactions were removed from current set of records 206 to make the records identical to the previous set of records, then it may be indicated that 5% of the results of the current query were removed. In this implementation, the content provider is provided with a set of records identical to a previous set of records, and therefore the content provider cannot ascertain individual interaction information from the results.

In some implementations, data modification subsystem 158 may remove a random amount of interaction data until it is determined that current set of records 206 is no longer similar to a previous set of records. In some implementations, the randomization process may be based on a random seed either chosen at random or based on the query itself. For example, a random seed may be determined by canonicalizing the query (e.g., determining a generic value based on the query). Therefore, similar queries may result in the same random seed, which may result in the same random data being removed in each current set of records generated by reporting system 150 for similar queries. By canonicalizing the query and removing the same random data from each set of records, the content provider receives the same set of records each query and therefore cannot determine individual data by comparing the sets of results. It should be understood that the method used to generate one or more random values to use for the removal of interaction data may vary, in some implementations. Random generation of values may include pseudo-random generation (e.g., generation of a value via a randomization algorithm that is pseudo-random in nature), or true random value generation.

In some implementations, the random data to be removed may be chosen based on the value of one or more parameters. For example, data modification subsystem 158 may take a modulo value of each identifier in the set of records, and remove all interaction data with the same modulo value. This allows for the same interaction data being removed from each similar query.

In some implementations, data modification subsystem 158 may track which data is removed from a given set of records. Therefore, when a new query comes from a particular content provider, or when a new query from the content provider includes similar parameters to a previous query, data modification subsystem 158 may identify which random data was removed from the previous set of records. Data modification subsystem 158 can then ensure that the same data is removed from current set of records 206, preventing the content provider from receiving a set of records with new data that is more easily identifiable. The removed data may be stored in, for example, database 170.

In some implementations, data modification subsystem 158 may not track which data is removed, or may remove different portions of data for each query from a content provider. Even if the content provider receives a new set of records with new data not in the previous set of records, the content provider cannot be sure if the new data truly represents new data (e.g., interactions that had occurred after the previous query) or data that was randomly removed from the previous set of records.

In some implementations, if the content provider 158 is running a plurality of queries, data modification subsystem 158 may progressively remove data from one query to the next (assuming each query is the same or substantially similar). For example, assume that a first percentage (e.g., 20%, 10%, 5%) of interaction data were removed from a previous set of records. If reporting system 150 receives a second query similar to the previous query, data modification subsystem 158 may remove the same first percentage of data from current set of records 206, plus an additional second percentage (e.g., 20%, 10%, 5%) of interaction data. For each subsequent query, data modification subsystem 158 may continue to remove an additional percentage of data. Each percentage may or may not be related to each other. For example, in some implementations, the second percentage may be smaller than the first percentage, may be the same percentage, or may be a larger percentage. Each subsequent percentage may be unrelated to one another, may increase or decrease uniformly or non-uniformly, or otherwise. The percentage of data removed at each query may vary, based on the amount of new data available since the previous query (i.e., the additional data removed at each query may be new data that was not available during the previous query). The percentage of data removed at each query may further be randomly selected. This can prevent the content provider's ability to determine when only a single extra interaction was added or removed from the set of records. Further, this may hide situations in which a user has deleted an account or changed an element in his or her profile (as such changes could be otherwise identified by the content provider). Data modification subsystem 158 may further provide a threshold check identifying when too much data has been removed during the process.

In any of the above implementations, reporting subsystem 160 may provide an indication that a portion of the interaction data was removed. The indication may include a percentage or raw number of entries that were removed, or simply an indication that some of the data was removed.

Data modification subsystem 158 may choose in some instances to add artificial data to current set of records 206 (212). In some implementations, new artificial data may simply be added until it is determined that current set of data 206 is no longer similar to the previous set of data. In some implementations, a combination of adding artificial data and removing data may be performed by data modification subsystem 158. The artificial data may be generated randomly using a random seed based on the query, allowing the same artificial data to be generated for similar queries. In other implementations, artificial data may be stored in database 170, allowing data modification subsystem 158 to use the same artificial data for similar queries.

In some implementations, data modification subsystem 158 may generate artificial data based on data either included or excluded from a previous set of records. For example, if a user has deleted his or her account with a content provider, the user may be associated with interaction data that shows up in the previous set of records but will not show up in the current set of records (since reporting system 150 can no longer receive interaction data relating to the user). Data modification subsystem 158 may generate artificial data masking the removal of the user, not allowing the content provider to identify that the user no longer has an account with the content provider.

In some implementation, data modification subsystem 158 may be configured to modify individual fields for a given interaction data. For example, each interaction data in a current set of records may include a user identifier, a timestamp, a resource, a platform, and characteristics of a user. In some implementations, data modification subsystem 158 may modify individual fields, such as a user's age, gender, income, location, or otherwise, preventing the content provider from identifying an individual interaction based on an individual characteristic.

It should be understood that while the examples provided in the present disclosure relate to a set of records relating to an individual content item, in other implementations the set of records may relate to multiple content items, or to content items displayed on a single resource or multiple resources. For example, the content provider may provide a query relating to all content items that were displayed on a single webpage. As another example, the content provider may provide a query relating to all content items that were displayed on multiple related webpages. As another example, the content provider may provide a query relating to a type of content item displayed on a webpage, or to specific content items displayed on a webpage. As another example, the content provider may provide a query relating to a specific content item slot on a webpage, or multiple content item slots across multiple webpages. The example of a single content item as described in the present disclosure is provided for simplicity and is not limiting.

Referring generally to FIGS. 3-8, various flow charts illustrating various methods of generating a set of records based on a query are shown. It should be understood that the methods shown in FIGS. 3-8 are provided by way of example only, and that other processes as described in the present disclosure are possible. Further, steps from different methods as shown in FIGS. 3-8 may be combined in the same method in other implementations.

Figure 3:
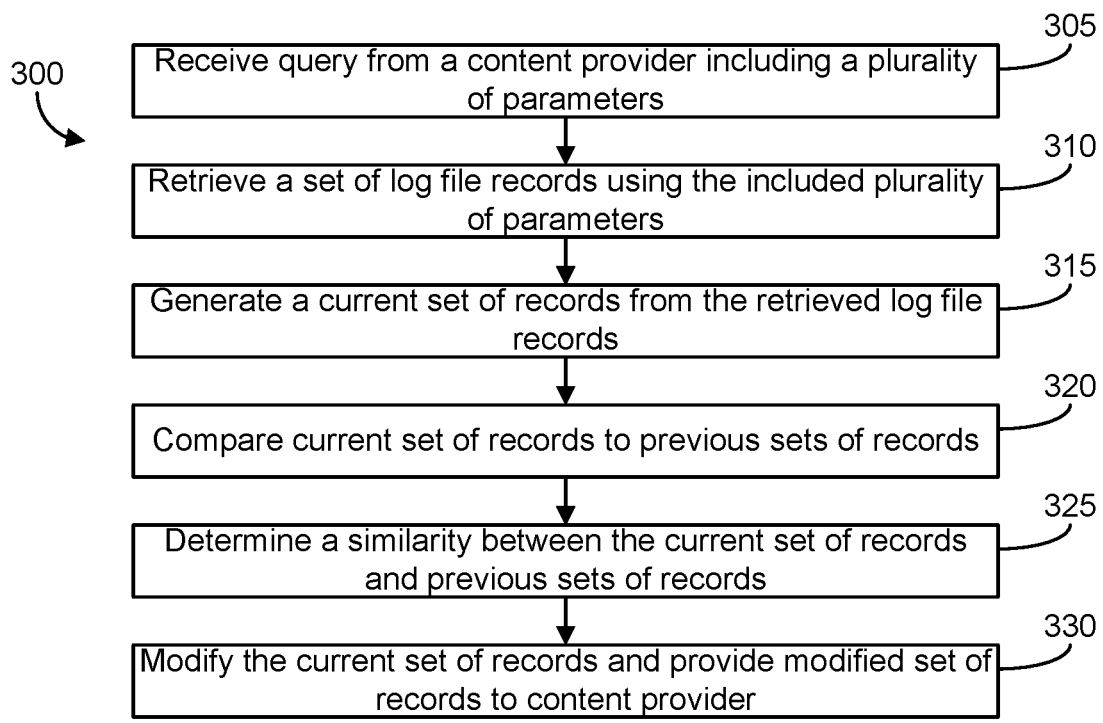
FIG. 3 a flow diagram of a process for providing a set of records to a content provider in response to a query from the content provider according to a first illustrative implementation.

Referring to FIG. 3, a flow diagram of a process 300 for providing a set of records to a content provider in response to a query from the content provider is shown. Process 300 may be executed by, for example, reporting system 150 as described with reference to FIGS. 1-2. Process 300 may be executed when a similarity between a current set of records and a previous set of records exceeds a threshold.

Process 300 includes receiving a query from a content provider (305). The query includes a plurality of parameters relating to interactions with a content item of the content provider. For example, the parameters may identify the content item for which interaction data should be retrieved, along with one or more characteristics, such as the type of platform on which the content item was viewed, the type of resource on which the content item was viewed, a time or date at which the content item was viewed, and the like.

Process 300 further includes retrieving a set of log file records using the included plurality of parameters (310). For example, 310 includes identifying all interactions stored in a log file in a database that have parameters that match the provided parameters. Process 300 further includes generating a current set of records from the retrieved log file records identifying interaction data with the content item (315).

Process 300 further includes comparing the current set of records to a previous set of records generated for a previous query from the content provider (320). At 320, previous sets of records for previous queries may be identified and retrieved. The activities of 320 may include comparing the current set of records to all previous sets of records, or may include identifying only the most relevant previous sets of records based on the queries and parameters associated with the current set of records and the previous sets of records.

Process 300 further includes determining a similarity between the current set of records and the previous set of records (325). In some implementations, the comparison is a min-hash technique used to determine the similarity between two sets of data. In other implementations, any type of comparison technique may be used. Process 300 further includes, if the similarity between the current set of records and a previous set of records is above a threshold similarity, modifying the current set of records and providing the modified set of records to the content provider (330).

Figure 4:
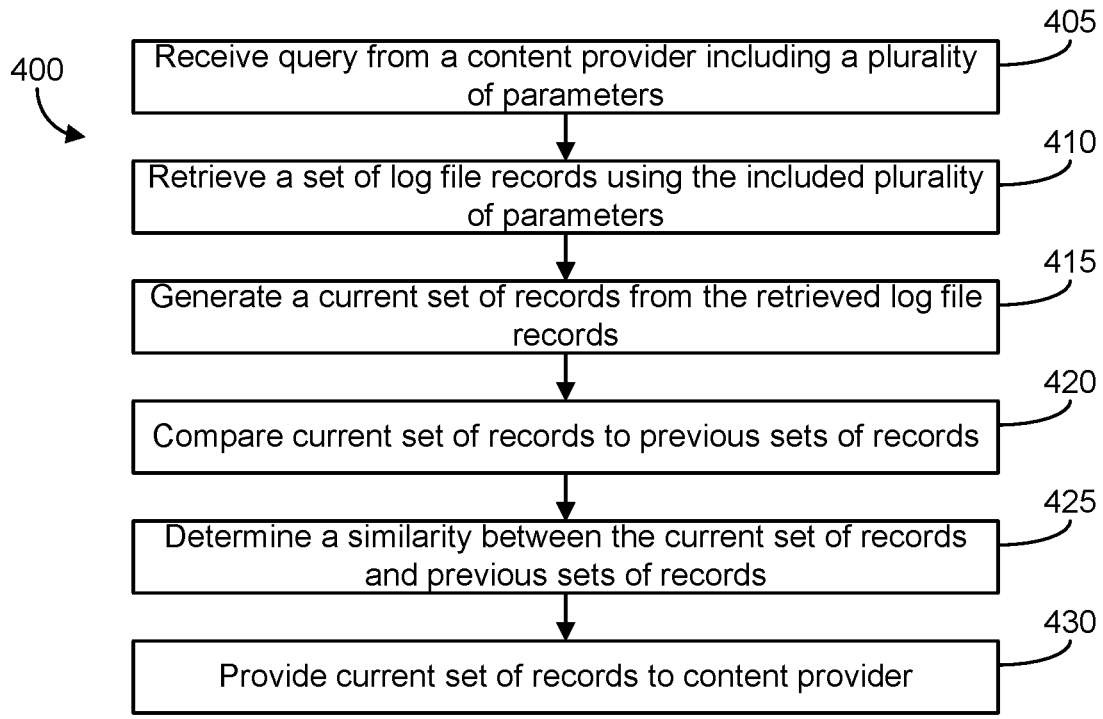
FIG. 4 a flow diagram of a process for providing a set of records to a content provider in response to a query from the content provider according to a second illustrative implementation.

Referring to FIG. 4, a flow diagram of a process 400 for providing a set of records to a content provider in response to a query from the content provider is shown. Process 400 may be executed by, for example, reporting system 150 as described with reference to FIGS. 1-2. Process 400 may be executed when a similarity between a current set of records and a previous set of records is below a threshold.

Process 400 includes receiving a query from a content provider (405). The query includes a plurality of parameters relating to interactions with a content item of the content provider. For example, the parameters may identify the content item for which interaction data should be retrieved, along with one or more characteristics, such as the type of platform on which the content item was viewed, the type of resource on which the content item was viewed, a time or date at which the content item was viewed, and the like.

Process 400 further includes retrieving a set of log file records using the included plurality of parameters (410). For example, 410 includes identifying all interactions stored in a log file in a database that have parameters that match the provided parameters. Process 400 further includes generating a current set of records from the retrieved log file records identifying interaction data with the content item (415).

Process 400 further includes comparing the current set of records to a previous set of records generated for a previous query from the content provider (420). At 420, previous sets of records for previous queries may be identified and retrieved. The activities of 420 may include comparing the current set of records to all previous sets of records, or may include identifying only the most relevant previous sets of records based on the queries and parameters associated with the current set of records and the previous sets of records.

Process 400 further includes determining a similarity between the current set of records and the previous set of records (425). In some implementations, the comparison is a min-hash technique used to determine the similarity between two sets of data. In other implementations, any type of comparison technique may be used. Process 400 further includes, if the similarity between the current set of records and a previous set of records is below a threshold similarity, providing the current set of records to the content provider (430). At 425, 430, the reporting system may determine that since the current set of records is not similar to any previous sets of records, the content provider may not be able to compare the current set of records to the other sets of records to identify individual interactions in the data set. Therefore, it is safe for the reporting system to provide the current set of records, unaltered, to the content provider.

Figure 5:
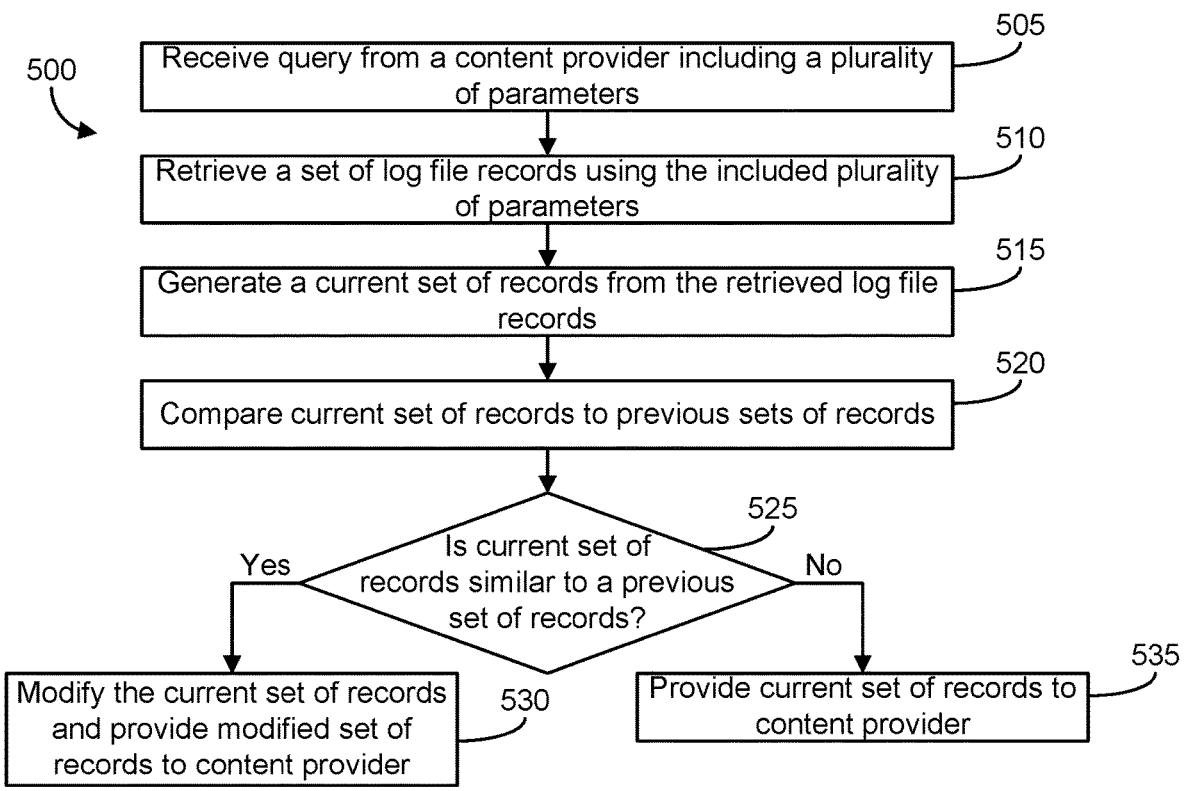
FIG. 5 a flow diagram of a process for providing a set of records to a content provider in response to a query from the content provider according to a third illustrative implementation.

Referring to FIG. 5, a flow diagram of a process 500 for providing a set of records to a content provider in response to a query from the content provider is shown. Process 500 may be executed by, for example, reporting system 150 as described with reference to FIGS. 1-2.

Process 500 includes receiving a query from a content provider (505). The query includes a plurality of parameters relating to interactions with a content item of the content provider. For example, the parameters may identify the content item for which interaction data should be retrieved, along with one or more characteristics, such as the type of platform on which the content item was viewed, the type of resource on which the content item was viewed, a time or date at which the content item was viewed, and the like.

Process 500 further includes retrieving a set of log file records using the included plurality of parameters (510). For example, 510 includes identifying all interactions stored in a log file in a database that have parameters that match the provided parameters. Process 500 further includes generating a current set of records from the retrieved log file records identifying interaction data with the content item (515).

Process 500 further includes comparing the current set of records to a previous set of records generated for a previous query from the content provider (520). At 520, previous sets of records for previous queries may be identified and retrieved. The activities of 520 may include comparing the current set of records to all previous sets of records, or may include identifying only the most relevant previous sets of records based on the queries and parameters associated with the current set of records and the previous sets of records.

Process 500 further includes determining if the current set of records is similar to one of the previous set of records (525). In some implementations, the comparison is a min-hash technique used to determine the similarity between two sets of data. In other implementations, any type of comparison technique may be used. If the current set of records is similar to one of the previous set of records, process 500 further includes modifying the current set of records and providing the modified set of records to the content provider (530). Otherwise, process 500 further includes providing the current set of records to the content provider (535).

Figure 6:
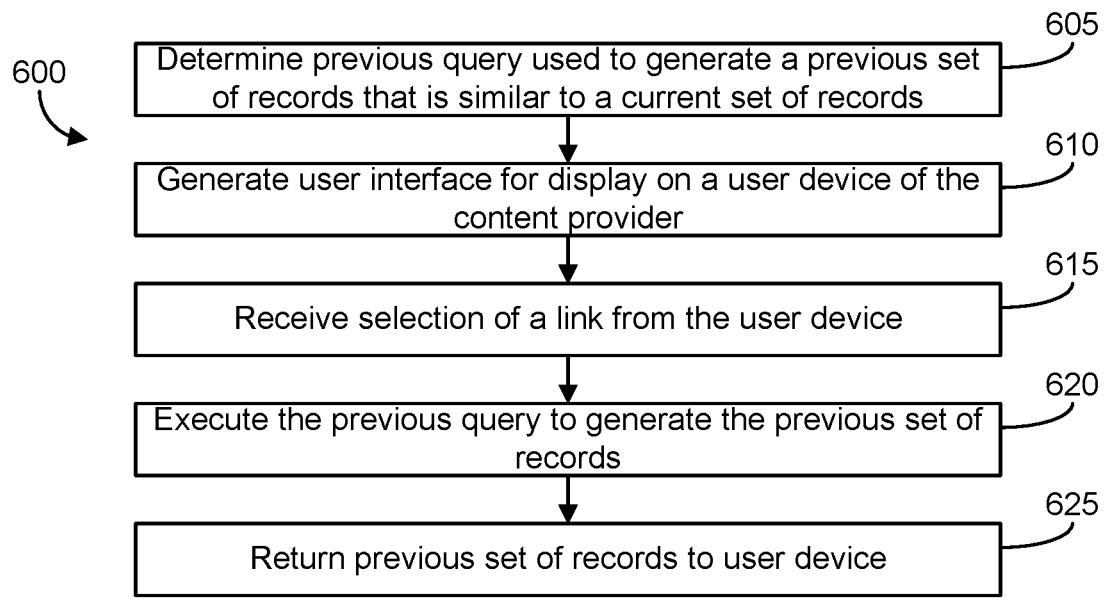
FIG. 6 is a flow diagram of a process for providing a link to a previous query in response to a query from the content provider according to an illustrative implementation.

Referring now to FIG. 6, a process 600 of generating a report for a content provider is shown. Process 600 may be executed at, for example, 330 of process 300, or 530 of process 500 as described above. In the example of FIG. 6, it has been determined that the current set of records generated based on a query is too similar to a previous set of records generated by a previous query from the content provider.

Process 600 includes determining the previous query used to generate the previous set of records that is similar to the current set of records (605). Process 600 further includes generating a user interface for display on a user device of the content provider (610). The user interface may include, for example, a dialog that indicates that a set of records generated based on the query submitted by the content provider is too similar to a set of records from a previous query. The user interface may further include a link that, upon selection, would cause the reporting system to execute the previous query again. Process 600 further includes receiving selection of the link from the user device (615) and executing the previous query to generate the previous set of records (620). The reporting system may then return the previous set of records to the user device (625).

Figure 7:
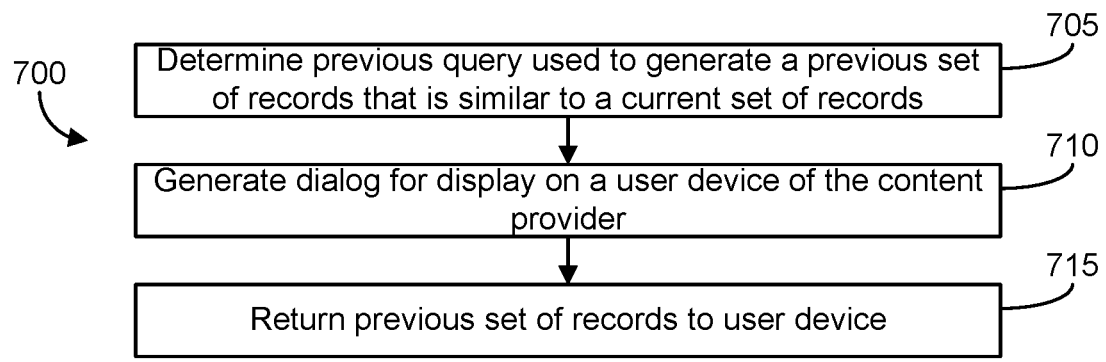
FIG. 7 is a flow diagram of a process for providing a previous set of records in response to a query from the content provider according to an illustrative implementation.

Referring now to FIG. 7, a process 700 of generating a report for a content provider is shown. Process 700 may be executed at, for example, 330 of process 300, or 530 of process 500 as described above. In the example of FIG. 7, it has been determined that the current set of records generated based on a query is too similar to a previous set of records generated by a previous query from the content provider.

Process 700 includes determining the previous query used to generate the previous set of records that is similar to the current set of records (705). Process 700 further includes generating a dialog for display on a user device of the content provider (610). The dialog may indicate that a set of records generated based on the query submitted by the content provider is too similar to a set of records from a previous query. The dialog may further include an explanation as to how similar the sets of records are, one or more suggestions for the content provider for future queries, and the like. Process 700 further includes returning the previous set of records associated with the previous query for display on the user device (615).

Figure 8:
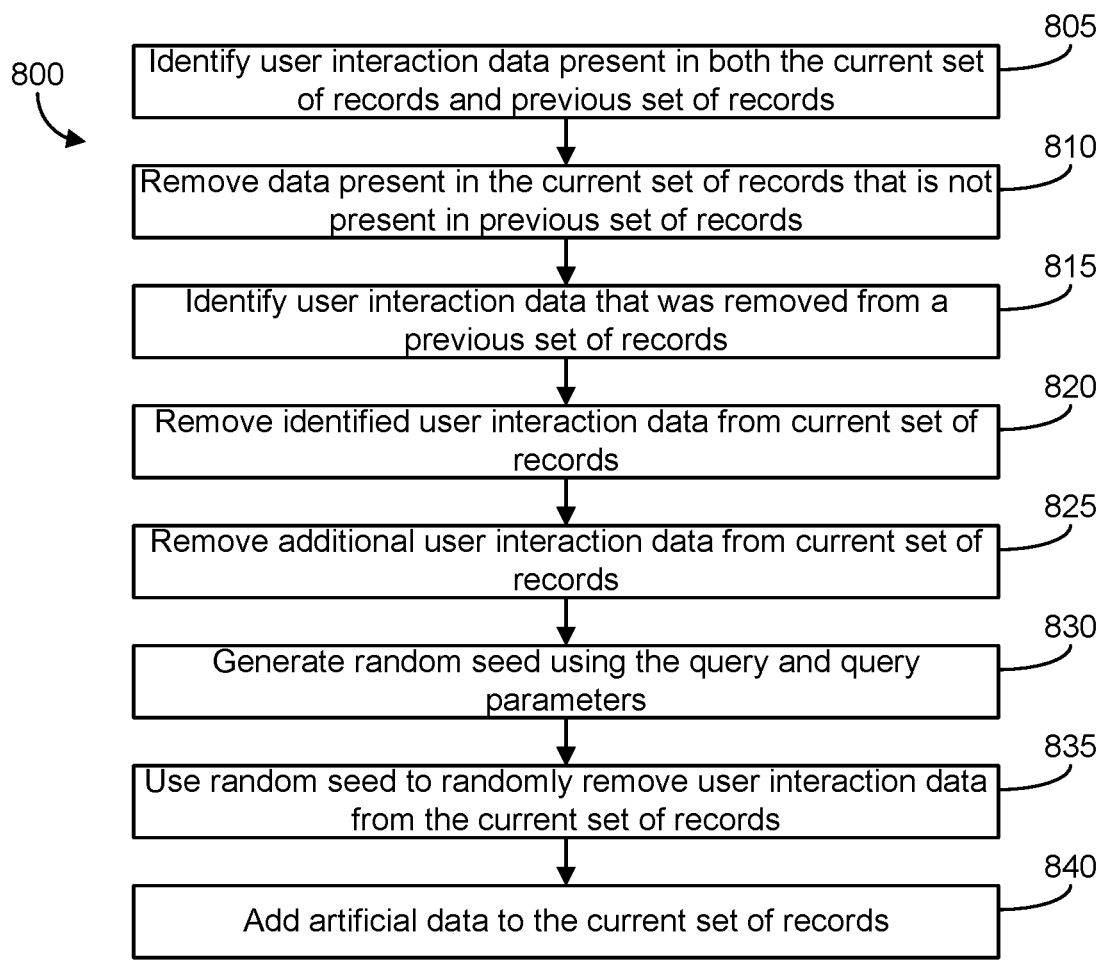
FIG. 8 is a flow diagram of a process for modifying a current set of records according to an illustrative implementation.

Referring now to FIG. 8, a process 800 of generating a report for a content provider is shown. Process 800 may be executed at, for example, 330 of process 300, or 530 of process 500 as described above. In the example of FIG. 8, it has been determined that the current set of records generated based on a query is too similar to a previous set of records generated by a previous query from the content provider. It should be understood that while process 800 includes various steps, the order of the steps may differ, and some steps may be skipped in various implementations based on the similarity between the current set of records and the previous set of records.

Process 800 includes identifying interaction data present in both the current set of records and previous set of records (805). In some implementations, process 800 includes removing data present in the current set of records that is not present in the previous set of records (810). This may cause the set of records returned to the content provider to contain the same interaction data as a set of records previously provided to the content provider.

In some implementations, process 800 includes identifying interaction data that was removed from a previous set of records (815) and removing the same interaction data from the current set of records (820). For example, the reporting system may have removed interaction data during generation of the previous set of records. The reporting system can then ensure that the same data is removed from the current set of records, preventing the content provider from being able to identify the new (to them) data.

In some implementations, process 800 includes removing additional interaction data from the current set of records (825). For example, since a content provider may submit similar queries regularly, an additional percentage of interaction data may be removed from each subsequent set of records generated by the reporting system.

In some implementations, process 800 includes generating a random seed (830) and using the random seed to randomly remove interaction data from the current set of records (835). The reporting system may be configured to generate the random seed based on the query or query parameters, allowing the same random seed to be used for similar queries. Therefore, the same random data may be removed from multiple set of records generated by the reporting system.

In some implementations, process 800 includes adding artificial data to the current set of records (840). The artificial data may be generated randomly using a random seed based on the query, allowing the same artificial data to be generated for similar queries.

It should be understood that the various methods described in FIGS. 3-8 and in the present disclosure may be combined in any way without departing from the scope of the present disclosure. More particularly, for multiple queries run by a content provider, reporting system 150 may combine methods across the multiple queries to ensure that the content provider does not receive similar sets of records. As one example, for a first query, reporting system 150 may remove a percentage of interaction data from the set of records, based on a random seed as described above. For the second query, reporting system 150 may remove the same interaction data from a set of records that was removed from the first set of records, and may or may not remove an additional percentage. For each subsequent query, reporting system 150 may determine whether or not to remove additional interaction data beyond what was already removed, based on the tendencies of the content provider. Further, reporting system 150 may add artificial interaction data to the first set of records, and may determine whether or not to add the same artificial interaction data, different artificial interaction data, or no artificial interaction data to each subsequent set of records.

Referring to FIGS. 9-11, example user interfaces that can be generated by reporting system 150 and more particularly report generation subsystem 160 are shown. Referring to FIG. 9, an example user interface 900 is shown that can be generated in response to a content provider query. In the example of FIG. 9, reporting system 150 has chosen to provide the content provider with a link to execute an old query of the content provider. Referring to FIG. 10, an example user interface 1000 is shown that can be generated in response to a content provider query. In the example of FIG. 10, reporting system 150 has chosen to show the results of a previous query instead of results of the current query, along with a dialog indicating the old query.

Referring to FIG. 11, an example user interface 1100 is shown. In the example of FIG. 11, reporting system 150 has chosen to modify the current set of records before providing the results to the content provider. The modified set of records is displayed on user interface 1100 along with dialog explaining that the data was modified. For example, in FIG. 11, it may be explained that a percentage of the interaction data has been removed. In other implementations, the dialog may indicate a raw number of interaction data that has been removed, or may not specify how much interaction data was removed. The dialog may also include an indication as to why interaction data was removed.

Figure 12:
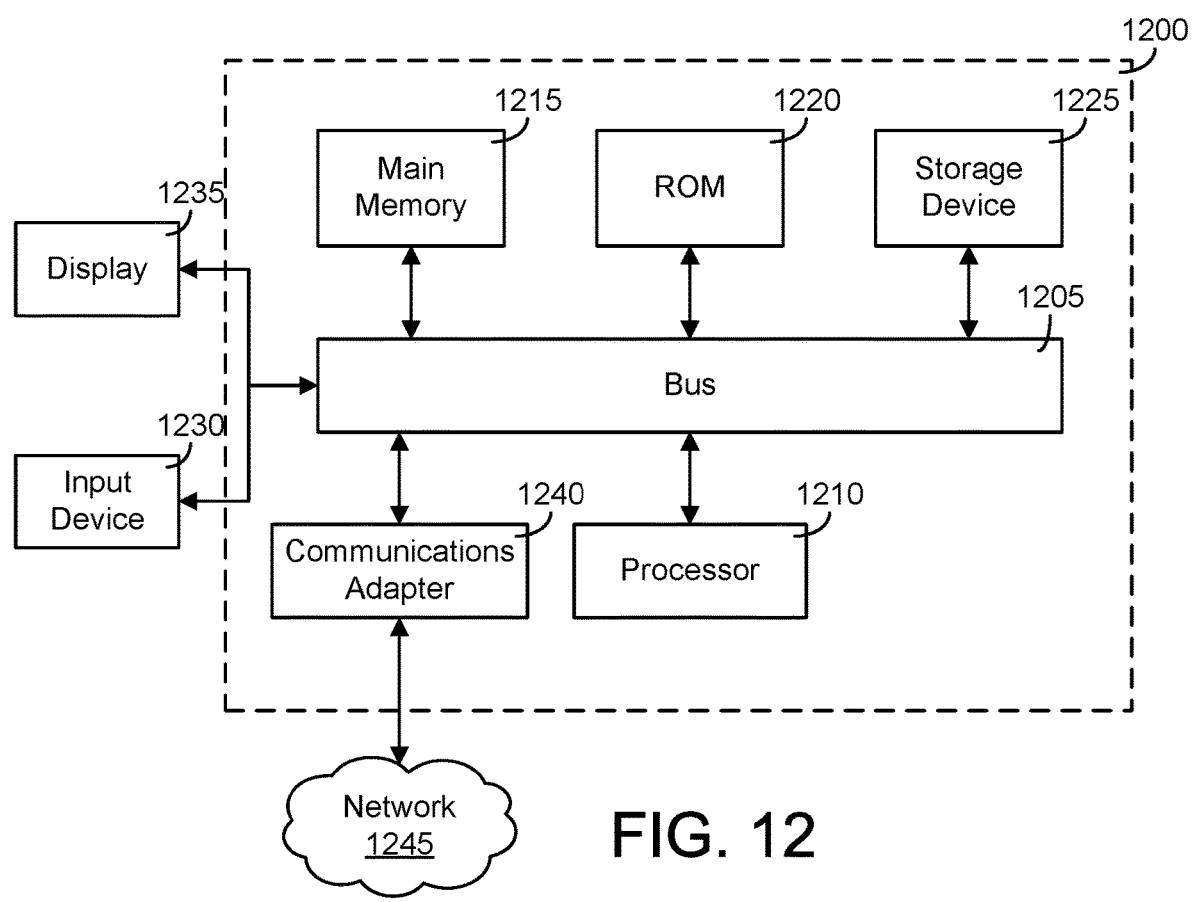
FIG. 12 is a block diagram of a computing system according to an illustrative implementation.

FIG. 12 illustrates a depiction of a computer system 1200 that can be used, for example, to implement an illustrative user device 104, an illustrative content management system 108, an illustrative content provider device 106, an illustrative reporting system 150, and/or various other illustrative systems described in the present disclosure. Computing system 1200 includes a bus 1205 or other communication component for communicating information and a processor 1210 coupled to bus 1205 for processing information. Computing system 1200 also includes main memory 1215, such as a random access memory (RAM) or other dynamic storage device, coupled to bus 1205 for storing information, and instructions to be executed by processor 1210. Main memory 1215 can also be used for storing position information, temporary variables, or other intermediate information during execution of instructions by processor 1210. Computing system 1200 may further include a read only memory (ROM) 1220 or other static storage device coupled to bus 1205 for storing static information and instructions for processor 1210. A storage device 1225, such as a solid state device, magnetic disk or optical disk, is coupled to bus 1205 for persistently storing information and instructions.

Computing system 1200 may be coupled via bus 1205 to a display 1235, such as a liquid crystal display, or active matrix display, for displaying information to a user. An input device 1230, such as a keyboard including alphanumeric and other keys, may be coupled to bus 1205 for communicating information, and command selections to processor 1210. In another implementation, input device 1230 has a touch screen display 1235. Input device 1230 can include a cursor control, such as a mouse, a trackball, or cursor direction keys, for communicating direction information and command selections to processor 1210 and for controlling cursor movement on display 1235.

In some implementations, computing system 1200 may include a communications adapter 1240, such as a networking adapter. Communications adapter 1240 may be coupled to bus 1205 and may be configured to enable communications with a computing or communications network 1245 and/or other computing systems. In various illustrative implementations, any type of networking configuration may be achieved using communications adapter 1240, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 1200 in response to processor 1210 executing an arrangement of instructions contained in main memory 1215. Such instructions can be read into main memory 1215 from another computer-readable medium, such as storage device 1225. Execution of the arrangement of instructions contained in main memory 1215 causes computing system 1200 to perform the illustrative processes described herein. One or more processors in a multi-processing arrangement may also be employed to execute the instructions contained in main memory 1215. In alternative implementations, hard-wired circuitry may be used in place of or in combination with software instructions to implement illustrative implementations. Thus, implementations are not limited to any specific combination of hardware circuitry and software.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the content visibility methods herein are used for is not limiting.

Although an example processing system has been described in FIG. 12, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, by one or more processors, a first query from a content provider, the first query including a first plurality of parameters relating to interactions with a content item of the content provider;
    retrieving, by the one or more processors from a database, a first set of log file records based on the first query using the first plurality of parameters;
    generating, by the one or more processors from the first set of log file records, a first set of records identifying first interaction data with the content item;
    receiving, by the one or more processors, a second query from the content provider, the second query including a second plurality of parameters relating to interactions with the content item of the content provider;
    retrieving, by the one or more processors from the database, a second set of log file records based on the second query using the second plurality of parameters;
    generating, by the one or more processors from the second set of log file records, a second set of records identifying second interaction data with the content item;
    comparing, by the one or more processors, the second set of records to a the first set of records;
    determining, by the one or more processors, a similarity between the first set of records and the second set of records based on the comparing;
    modifying, by the one or more processors, in response to determining that the similarity is above a threshold similarity, the second set of records to reduce the similarity between the second set of records and the first set of records; and
    provide a response to the content provider comprising the modified second set of records and a dialog indicating that the modified second set of records have been modified from the second set of records retrieved based on the second plurality of parameters of the second query.

2. The method of claim 1, further comprising modifying a third set of records by replacing third interaction data of the third set of records with the first interaction data of the first set of records.

3. The method of claim 1, wherein providing the modified second set of records to the content provider comprises:
    providing a link for display on a user interface of a device of the content provider; and
    in response to selection of the link, providing data based on the modified second set of records for display on the user interface.

4. The method of claim 1, further comprising providing, by the one or more processors, a dialog for display on a user interface of a device of the content provider identifying the first query associated with the first set of records.

5. The method of claim 1, wherein modifying the second set of records comprising:
    adding artificial interaction data to the second set of records; and
    removing interaction data from the second set of records.

6. The method of claim 1, wherein modifying the second set of records comprises removing a portion of interaction data present in the second set of records, the method further comprising:
    providing a dialog for display on a user interface of a device of the content provider indicating that the portion of the interaction data was removed.

7. The method of claim 6, wherein modifying the second set of records comprises:
- determining that a different portion of interaction data had been removed from the first set of records;
- removing the different portion of interaction data that was removed from the first set of records from the second set of records; and
- removing an additional portion of interaction data from the second set of records.

8. The method of claim 1, wherein modifying the second set of records comprises:
- determining a subset of interaction data in the first set of records that is not present in the second set of records; and
- including the determined subset of interaction data in the second set of records.

9. The method of claim 1, wherein modifying the second set of records comprising:
- determining artificial interaction data inserted into the first set of records; and
- inserting at least a portion of the artificial interaction data into the second set of records.

10. A system, comprising:
- at least one computing device operably coupled to at least one memory and configured to:
  - receive a first query from a content provider, the first query including a first plurality of parameters relating to interactions with a content item of the content provider;
  - receive from a database, a first set of log file records based on the first query using the first plurality of parameters;
  - generate from the first set of log file records, a first set of records identifying first interaction data with the content item;
  - receive a second query from the content provider, the second query including a second plurality of parameters relating to interactions with the content item of the content provider;
  - retrieve, from the database, a second set of log file records based on the second query using the second plurality of parameters;
  - generate, from the second set of log file records, a second set of records identifying second interaction data with the content item;
  - compare the second set of records to the first set of records;
  - determine a similarity between the first set of records and the second set of records based on the comparison;
  - modify, in response to determining that the similarity is above a threshold similarity, the second set of records to reduce the similarity between the second set of records and the first set of records; and
  - provide a response to the content provider comprising the modified second set of records and a dialog indicating that the modified second set of records have been modified from the second set of records retrieved based on the second plurality of parameters of the second query.

11. The system of claim 10, wherein the at least one computing device is configured to modify a third set of records by replacing third interaction data of the third set of records with the first interaction data of the first set of records.

12. The system of claim 10, wherein the at least one computing device is configured to provide the modified second set of records to the content provider by:
- providing a link for display on a user interface of a device of the content provider; and
- in response to selection of the link, providing data based on the modified second set of records for display on the user interface.

13. The system of claim 10, the at least one computing device is further configured to provide a dialog for display on a user interface of a device of the content provider, the dialog identifying the first query associated with the first set of records.

14. The system of claim 10, wherein the at least one computing device is configured to modify the second set of records by:
- adding artificial interaction data to the second set of records; and
- removing interaction data from the second set of records.

15. The system of claim 10, wherein the at least one computing device is configured to modify the second set of records by:
- removing a portion of interaction data present in the second set of records; and
- providing a dialog for display on a user interface of a device of the content provider indicating that the portion of the interaction data was removed.

16. The system of claim 15, wherein the at least one computing device is configured to modify the second set of records by:
- determining that a different portion of interaction data had been removed from the first set of records;
- removing the different portion of interaction data that was removed from the first set of records from the second set of records; and
- removing an additional portion of interaction data from the second set of records.

17. The system of claim 10, wherein the at least one computing device is configured to modify the second set of records by:
- determining a subset of interaction data in the first set of records that is not present in the current second set of records; and
- including the determined subset of interaction data in the second set of records.

18. The system of claim 10, wherein the at least one computing device is configured to modify the second set of records by:
- determining artificial interaction data inserted into the first set of records; and
- inserting at least a portion of the artificial interaction data into the second set of records.

19. One or more computer-readable storage media having instructions stored thereon that, when executed by one or more processors, cause the one or more processors to execute operations comprising:
- receiving a query from a content provider, the query including a plurality of parameters relating to interactions with a content item of the content provider;
- retrieving, from a database, a set of log file records using the plurality of parameters;
- generating, from the retrieved log file records, a current set of records identifying interaction data with the content item for a first set of interactions;
- comparing the current set of records to a previous set of records generated by the one or more processors for a previous query from the content provider, the previous query resulting in a previous set of records identifying previous interaction data with the content item for a second set of interactions, the first set of interactions including at least some of the second set of interactions;

determining whether the first set of interactions includes more than a predefined amount of the second set of interactions;

in response to determining that the first set of interactions include more than the predefined amount of the second set of interactions, modifying the current set of records to reduce a similarity between the current set of records and the previous set of records by at least one of:

replacing at least a portion of interaction data of the current set of records with at least a portion of interaction data of the previous set of records;

adding artificial interaction data to the current set of records; or removing a second portion of interaction data in the current set of records, the removal of the second portion of interaction data based on at least one of previous interaction data that was present in the previous set of records or a randomly chosen subset of interaction data; and provide a response to the content provider comprising the modified second set of records and a dialog indicating that the modified second set of records have been modified from the second set of records retrieved based on the second plurality of parameters of the second query.

20. The one or more computer-readable storage media of claim 19, wherein the operations further comprise:

generating a random seed based on the query from the content provider, wherein the random seed is used to randomly select the second portion of interaction data to be removed from the current set of records.

* * * * *